United States Patent [19]

Van Eenam

[11] 4,308,187
[45] Dec. 29, 1981

[54] COMPOSITIONS FOR BONDING FIBROUS SUBSTRATES

[75] Inventor: Donald N. Van Eenam, Des Peres, Mo.

[73] Assignee: Monsanto Company, St. Louis, Mo.

[21] Appl. No.: 121,849

[22] Filed: Feb. 15, 1980

[51] Int. Cl.³ .............................................. D21H 3/44
[52] U.S. Cl. ...................... 260/29.6 RW; 162/168 R; 260/29.6 NR
[58] Field of Search .................. 260/29.6 E, 29.6 ME, 260/29.6 NR, 29.6 RB, 29.6 RW, 29.6 WB; 162/168 R

[56] References Cited

U.S. PATENT DOCUMENTS

| 3,207,718 | 9/1965 | Zimmerman | 260/29.6 RW |
|---|---|---|---|
| 4,033,920 | 7/1977 | Isozaki | 260/29.6 TA |
| 4,131,580 | 12/1978 | Emmons | 260/29.6 RW |
| 4,145,248 | 3/1979 | Van Eenam | 162/168 R |

Primary Examiner—Paul R. Michl
Attorney, Agent, or Firm—David Bennett; William J. Farrington; Paul D. Matukaitis

[57] ABSTRACT

Compositions suitable for bonding fibrous substrates such as air-laid paper mats comprise hydrophilic air-curing polymer and a thermoplastic polymer latex.

15 Claims, No Drawings

COMPOSITIONS FOR BONDING FIBROUS SUBSTRATES

BACKGROUND TO THE INVENTION

This invention relates to novel latex compositions that can be used to bond fibrous substrates so as to impart to the substrate desirable properties such as wet and dry strength, soft handle, stain resistance, permanent crease and permanent press characteristics and the like depending on the character and proportions of the components present in the composition.

For example when a paper mat is made by a modern air-laid process, the component fibers are only loosely tangled together and have little natural cohesion. Before such mats can be processed into commercial items such as paper towels or facial tissues, they must be treated chemically and/or mechanically to give them greater strength required for such uses. The versatile nature of the chemical treatment route leads to it being preferred over a purely mechanical treatment since by selection of the treating composition, certain desirable properties such as softness or handle can be maintained, enhanced or created.

The present invention provides a composition for treating fibrous substrates, especially cellulosic substrates, that has particularly advantageous dispersibility and strength-enhancing properties and exhausts relatively easily onto a dry laid web in a uniform and efficient manner. The composition is also effective as a wet-end additive for the generation of wet and dry strength in a paper-making process as well as in a plurality of non fiber-related applications such as in coating compositions.

DISCUSSION OF THE PRIOR ART

In the enhancement of the strength, e.g. of dry laid cellulosic webs it is conventional to apply a latex of a polymer that can undergo a heat-set curing or thermolysis reaction such that the polymer bonds the fibers together and gives coherence.

It is also known that polymers containing a plurality of olefinic unsaturations can undergo a cross-linking reaction by an air-curing or free-radical induced cross linking mechanism. One specific group of polymers that are essentially hydrophilic and which very readily undergo a highly efficient air-curing reaction is described in U.S. Pat. No. 145,248. These air-curing polymers have been proposed as additives for cellulosic substrates particularly as wet strength additives and as textile-treating agents for improved performance.

However both types of additive have certain drawbacks when used to treat substrates such as air-laid cellulosic mats, fibrous textiles and the like. For example the thermoplastic polymer latices have to be applied in large quantities in order to be effective because of the relatively inefficient transport of the particulate solid latex particles through the substrate resulting in either the need for an excessive level of addition or treatment only of the surface of the substrate. Furthermore they tend to impart only dry tensile strength with minimal improvement in wet tensile strength.

The air-curing polymers are hydrophilic and are more efficient at penetrating a substrate largely because they have good flow along the fiber surfaces. They do tend however to be somewhat expensive to use if a thick, loosely compacted mat is involved. In addition they generate comparatively minor improvements in dry strength.

A composition has now been discovered that provides a relatively low cost but highly efficient way of providing for example an air-laid cellulosic fiber mat or a non-woven loosely-bonded, fibrous textile substrate with cohesion, wet and dry strength and, if desired, a wide range of other desirable properties. Moreover the composition is lower in cost than the best air curing polymers while being much more efficient than the best latices.

The composition can also be used as a wet-end additive in a conventional paper making process. Besides paper related uses the compositions of the invention can also be used on woven and non-woven textile fabrics of non-cellulosic materials and as a crosslinking aid for coating compositions such as latex-based paints or even oil based paints.

DESCRIPTION OF THE INVENTION

The invention comprises a composition having a water wicking time of less than 30 seconds comprising A. from 5 to 95% by weight, of a thermoplastic polymer in the form of solid, stably dispersed latex particles and B. from 95 to 5% by weight of a hydrophilic polymer having a backbone comprising at least one segment with the formula

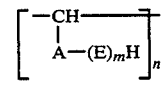

wherein A is a moiety terminating in the residue of an active hydrogen-containing group selected from the group consisting of alcoholic hydroxyl, thiol, amide, carboxylic acid, and secondary amine with an active hydrogen removed; E is a moiety containing a radical having an activated olefinic unsaturation either $\alpha$, $\beta$ or $\beta$, $\gamma$ to the activating group; n is the number of adjacent segments having this formula and n and m are integers and are each at least 1 provided that where either is less than 4, the other is at least 4; all the weight being based on the total polymer weight in the composition.

The "water wicking time" is a measure of the hydrophilicity of the composition and may be determined by applying the composition in the form of an aqueous dispersion to a Whatman #1 filter paper at a 10% weight/weight ratio, drying the paper at 120° C. for 10 minutes in a circulating air oven drier and then dropping on to the center of the horizontally positioned paper a 0.10 ml. drop of water at 22° C. and measuring the time for the drop to disappear. The end point is determined by the disappearance of the gloss indicating that no water film remains on the surface. The speed with which this occurs is a function of the speed with which the water is dissipated through the paper by the wicking effect and thus in turn is controlled by the hydrophilicity of the fibers. If therefore a cellulosic paper substrate (which is naturally very hydrophilic) is treated with a hydrophobic composition, the water will tend initially to "bead" rather than be absorbed and spread through the paper. Thus the "water wicking time" is a very effective technique for assessing the hydrophilicity of a composition by a practical and easily performed test.

In water, Component B forms an aqueous emulsion and it is known that such emulsions taken alone, exhibit little viscosity change with concentration. By contrast latices such as Component A exhibit steep proportional response between viscosity and concentration. When aqueous latices are placed on hydrophilic substrates of high surface area such as untreated paper, the water is conducted away and the latex becomes increasingly concentrated until the particles coalesce and lose all their mobility. Hence a latex applied to a hydrophilic substrate does not readily spread evenly through the substrate matrix. By contrast emulsions of air curing polymers such as Component B in the same circumstances remain fluid and fast spreading along the fibers, tending to collect at fiber/fiber crossover points due to interfacial surface tension effects. They are therefore extremely effective as wet strength additives.

It has now been found that Component B polymers are highly effective as viscosity suppressants, or spreading agent stabilizers for latices comprising a Component A polymer. A latex incorporating such an air curing polymer is able to spread evenly through a cellulosic substrate for example, much more readily than would the latex alone. What is more, the activity of both components remains unimpaired by this cooperation, indeed in many cases it is enhanced as the Examples set forth below will demonstrate.

COMPONENT A

Component A is a thermoplastic polymer in the form of solid stably-dispersed latex particles.

It is recognized that, if the Component A is somewhat hydrophobic, the overall hydrophilicity of the composition of the invention can be adjusted using a suitable surfactant. Compositions comprising a hydrophobic polymer and a surfactant are therefore embraced within the purview of this invention.

Should the substrate to be treated be fibrous in nature and be such as to require good hand, softness or other comfort characteristics, it is often desirable to match these properties with those of the latex. The latter then should be soft, tough and pliable, and these properties are associated with polymers of low Tg, that is with a glass transition temperature of from about $-50°$ C. to $20°$ C.

It is preferred that the polymer be a homopolymer or a copolymer of an unsaturated ester monomer such as a vinyl or allyl ester or an acrylate ester. Specific examples of suitable thermoplastic polymers that can provide the Component A include: polyvinyl acetate, ethylene/-vinyl acetate copolymers, ethylene/vinyl chloride copolymers, polyvinyl chloride and various acrylic polymers commercially available as latices.

It is of course necessary that the polymer is not such as would interfere with the air-curing chemistry of Component B. This is the case for example with highly reactive polymers such as the ethyleneimines, polymers containing an N-methylimido functionality as well as other compounds which act as free radical inhibitors, stabilizers, antioxidants and the like. Vinyl acetate based polymer latices that are particularly useful in the invention are those which can undergo thermolysis reactions and subsequent crosslinking. This in fact is one mechanism by which some polymer latices that are conventionally added to air laid webs generate an increase in wet as well as dry strength. Thus the preferred polymer is one which undergoes thermolysis below about $250°$ C. and more preferably $180°$ C. so that the underlying substrate is not damaged. Such polymers are generally film-forming thermoplastic polymers and copolymers that comprise groups that can easily be split off in a thermolysis reaction.

Less preferred polymers are those that contain a plurality of unsaturations and are capable of undergoing a curing operation while in place on a substrate. As an example both liquid polybutadiene emulsions and particulate solid latices are capable of undergoing an air-curing type cross-linking operation and it is found that these are aided by the presence of the air-curing polymer of Component B. However such polymers tend to be strongly hydrophobic so that large amounts of an additive imparting hydrophilic properties are necessary to give the overall composition a water-wicking time in the prescribed range.

Component A is usually employed in the form of a latex comprising dispersed polymer particles with a weight mean average diameter of from 0.05 to 2.0 micron and preferably from 0.2 to 0.8 micron.

As indicated above a Component A latex can if desired be stabilized by a surfactant system that may or may not be identical to any emulsion stabilizer used in connection with Component B. The amount of each surfactant will depend greatly on both latex and emulsion properties and structures. Each resin has its own emulsifier need and either an excess or a deficiency can lead to a break in the stability of either. In general however from 1 to 3 percent by weight of the surfactant may be required. If a surfactant is used it should preferably be of the anionic or non-ionic variety so as to avoid de-stabilizing interactions. The use of protective colloids such as polyvinyl alcohol, carboxy methyl cellulose, hydroxyethyl cellulose and the like may often be very advantageous as viscosity enhancers for the aqueous phase as well as for stabilizing the emulsion of Component B.

A Component A latex usually contains from 20 to 60 percent by weight of the polymer but less may be appropriate if the Component B is added directly as an oil.

It is of course not necessary that Component A be employed directly as a latex. In some instances a polymer melt can be added to an emulsion of Component B and dispersed such that the mixture comprises stably dispersed solid particles of Component A and stably dispersed liquid droplets of Component B. Solutions of the polymer in an organic solvent can also be used in the generation of a suitable latex of Component A.

The dispersion medium is most conveniently water but this is not essential since the chief function of the liquid is to aid application to, and transport of the composition through, any fibrous substrate to which it may be applied. In the case of a hydrophilic substrate it would clearly be desirable to use a hydrophilic dispersion medium.

COMPONENT B

As indicated above, Component B is an air-curing polymer that is a hydrophilic liquid and can be added directly as the polymer, an aqueous dispersion or as a true emulsion.

Component B is a hydrophilic polymer having a backbone comprising at least one segment with the formula:

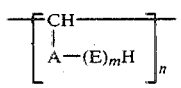 [I]

where A is a moiety terminating in the residue of an active hydrogen-containing group selected from the group consisting of alcoholic hydroxyl, thiol, amide, carboxylic acid and secondary amine with an active hydrogen removed, E is a moiety containing a radical having an activated olefinic unsaturation, either α, β or β, γ to the activating group, n is the number of adjacent (as the term is hereinafter defined) segments having this formula, and n and m are integers and are each at least 1, provided that where one is less than 4 the other is at least 4.

The polymers can have a plurality of adjacent segments of the above formula and by "adjacent" is meant that they are directly connected through a carbon-carbon bond or are indirectly connected through a

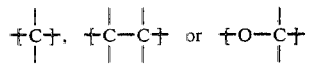

group or an oxygen or sulfur atom.

The effectiveness of the polymers depends to a large extent on the provision of a plurality of activated double bonds which are spatially closely related. These double bonds are sites at which oxygen-initiated crosslinking takes place during the drying or accelerated or natural aging operation. Thus, the provision of blocks of activated double bonds each of which can provide a bond site, increases the potential crosslinking density as well as the structural strength of the crosslinks that form both inter-and intra-molecularly during drying and/or aging.

The double bonds are activated, by which is meant that by virtue of their proximity in the polymer molecule to other strongly electron-donating groups, they are more ready to form crosslinks during the air curing process. Examples of such electron-donating groups include ether, sulfide, hydroxyl, carboxyl, and olefinically unsaturated groups. The preferred electron-donating group is an ether group.

The crosslinking mechanism is similar to that by which many paints based on so-called "drying oils" form a hard tough skin when they dry. Such paints may contain one or more hydrophobic triglyceride esters of various unsaturated fatty acids and "curing" occurs by reaction of an oxygen molecule with one or more intralinear unsaturation to form a peroxide-type bridge between the two unsaturated sites. The more unsaturation there is in the acid, the more rapidly does curing occur. The best are derived from acids with multiple conjugated unsaturations. The crosslinking occurs both intra- and intermolecularly.

As has been indicated earlier, it is necessary that the polymer be hydrophilic. Certain of the suitable polymers are completely soluble in water. This may be achieved by the choice of the backbone compound but it may also be the result of the selection of an appropriate molecular ratio of backbone compound to the reactant affixing the pendant unsaturation to the backbone. Alternatively, the introduction of highly water-solubilizing groups such as quaternary ammonium, sulfonium, phosphonium, isothiouronium and other similar cationic groups or the incorporation of a plurality of ether oxygen atoms can be used to achieve water solubility or emulsifiability.

The description of the polymer as "hydrophilic" is therefore, to some extent, a reflection of the ratio of oxygen to carbon in the polymer. Generally, the greater the ratio the more hydrophilic is the polymer. However, hydrophilicity is best observed by the behavior of water placed on a fibrous surface that is normally absorbant (i.e. which is unmodified with additives that would destroy its porosity) that has been treated with the polymer. A hydrophobic polymer such as a drying oil-based paint causes the water to run off or form discrete droplets on the fibrous surface which, in effect, is waterproofed. A hydrophilic polymer on the other hand, allows the surface to become wetted and, if of a porous material, allows the water to be absorbed into the material by a "wicking" effect.

Qualitatively therefore, the term "hydrophilic" polymer is understood to describe a polymer that can be applied to an unmodified cellulosic substrate without causing water applied to the treated substrate to run off or form discrete droplets. In other words, the polymer does not destroy the power of the substrate to absorb water or to be wetted by it.

Quantitatively it is found that hydrophobic polymers have a surface energy of about 40 dynes or less (water has a surface energy of 72 dynes). "Hydrophilic" polymers suitable for imparting wet/dry strength to cellulosic substrates, have a surface energy of at least 50 and an unmodified cellulosic substrate treated therewith has a surface energy of at least 65 dynes.

The polymers can be formed by the reaction of a compound having an activated double bond and epoxy group with a molecule having a plurality of active hydrogen-containing groups selected from alcoholic hydroxyl, thiol, amide and carboxylic acid but not primary amine groups. Since it is also desirable that the polymer be hydrophilic it is often preferred that hydroxyl groups should provide the active hydrogen-containing groups. The polymer should not contain primary or secondary amine groups or phenolic hydroxy groups since such groups interfere with the curing reaction.

The polymers can for example, be prepared by the reaction of a backbone compound having at least one and preferably from 1 to 6 moieties containing active hydrogen-containing groups with a compound containing both an epoxide group and an activated double bond in proportions such that from 1 to 20 epoxide radicals are provided for each active hydrogen-containing groups on the backbone compound and the polymer produced has at least one block of at least four adjacent activated double bonds.

Alternatively, a polymer chain having a plurality of adjacent pendant hydroxyl groups can be reacted with, for example, allyl chloride using the techniques of Williamson's ether synthesis. Alternatively, the same Williamson synthesis technique may be employed using a polymer chain with pendant halogen atoms and an unsaturated alcohol such as allyl alcohol. This results in the generation of adjacent allyloxy groups pendant from the polymer backbone that can form a suitable block of unsaturation conferring the desired air-curing characteristics on the polymer.

Yet another method by which the polymer may be prepared is by the Lewis acid promoted polymerization of vinyl allyl ether. This reaction is selective to the vinyl group and results in a chain of carbon atoms with an allyloxy group pendant from every other carbon atom.

There are, therefore, two basic types of polymer embraced by the formulation above. The first type comprises a backbone molecule with as little as one moiety containing an active hydrogen-containing group which is reacted with a compound containing an epoxy group and an activated terminal double bond in proportions such that there are at least four and preferably from 4 to 10 or even 20 epoxy groups per active hydrogen-containing group. As a simple example the polymer obtained by reacting 1 mole of glycol with 8 moles of allyl glycidyl ether produces a polymer having the average structure

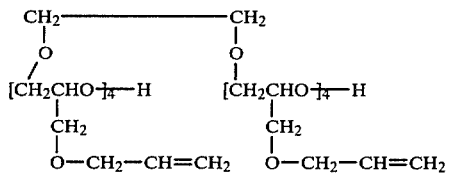

-thus providing two blocks of four adjacent allylic groups—assuming of course, uniform addition at both sides. In this compound the moiety A in formula (I) is -O- and the moiety E is

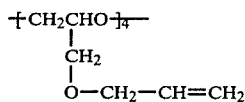

and has the double bond $\beta$, $\gamma$ to the activating oxygen group.

The other type of structure is obtained for example, when a backbone molecule which comprises at least four adjacent active hydrogen-containing groups is reacted with an unsaturated epoxy compound as described above or alternatively, using Williamson's ether synthesis, with allyl chloride to produce a block of pendant allylic groups. In this case the ether oxygen provides the activation for the double bond in the allyl group and also the group "A". An example of such a product is that produced by the reaction of allyl chloride with polyglycidol to produce a polymer having structure with repeating units of the formula

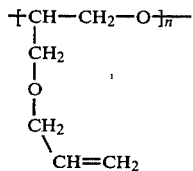

Here the moiety A in formula (I) is $-\!\!+\!CH_2O\!+\!-$, the moiety E is $-\!\!+\!CH_2-\!CH=\!CH_2\!+\!-$ and m is 1 and n is at least 4, the olefinic unsaturation is $\beta$, $\gamma$ to the activating oxygen.

The backbone compound can therefore, be a polymeric polyol such as polyethylene glycol, polyglycerol, polyglycidol, polyvinyl alcohol, a partially hydroxyzed polyvinyl acetate, a styrene/allyl alcohol copolymer, poly (2-hydroxyethyl acrylate), poly(vinyloxyethanol), a monomeric polyol such as sorbitol, mannitol, or ethylene glycol; a monomeric alcohol such as allyl alcohol, the corresponding thiols; and dicarboxylic acids such as fumaric acid, maleic acid, malonic acid and phthalic acid. Also, compounds containing a mixture of radicals can be used such as hydroxy acids, which are compounds containing the carboxyl and hydroxyl radicals, hydroxy amides, hydroxy ethers, hydroxy esters, and the like. However, polyhydric alcohols having from 4 to 6 carbon atoms are preferred and sorbitol is especially preferred.

The epoxy compound reacted with the backbone compound comprises an epoxide group and an activated double bond.

The epoxy compounds that can be used have the general formula

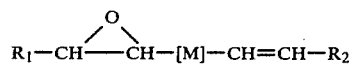

wherein M is absent or is a group capable of activating the double bond such as for example the following

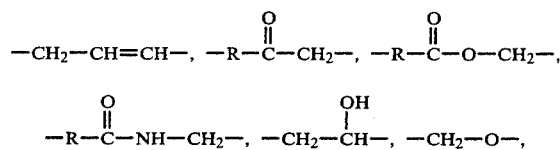

$-CH_2-S-$, $-CH_2-O-CH_2-$, and $-CH_2-S-CH_2-$, wherein R is a $C_1$ to $C_4$ alkylene group and $R_1$ and $R_2$ are each hydrogen or $C_1$ to $C_4$ alkyl groups. The corresponding episulfides may also be used.

It is important that the activating group does not comprise a moiety that will inhibit or deactivate the air-curing mechanism. Such disfavored groups include free primary and secondary amine, phenolic hydroxyl and aldehyde groups.

Preferred compounds include allyl glycidyl ether, sorbyl glycidyl ether, butadiene monoxide and vinyl cyclohexene monoxide. The most preferred reactant which is also readily available at relatively low cost is allyl glycidyl ether.

One particularly preferred feature is the use of an allyl glycidyl ether reaction product obtained by the reaction of a small excess of epichlorohydrin with allyl alcohol The allyl glycidyl ether reaction product has the empirical formula:

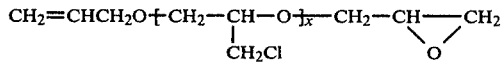

where x is a fraction up to 0.5, usually about 0.25.

It is preferred that the above reaction product is dried before use such that it contains less than 0.1% by weight of water which would otherwise give rise to undesirable side reactions.

This preferred feature is not confined to the specific allyl glycidyl ether reaction products described above. Expressed more generically, preferred polymers of the invention that can be produced using such products have the formula:

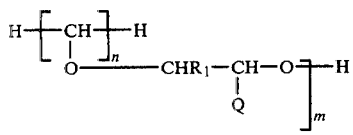

wherein n is an integer which is preferably from 2 to 6; m is an integer which is preferably from 6 to 10 with the proviso that where either of m or n is less than 4 the other is at least 4; $R_1$ is hydrogen or a $C_1$ to $C_4$ alkyl group; and Q is a moiety with the empirical formula:

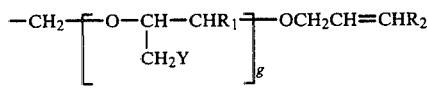

where g is a fraction up to 0.5; Y is halogen or, in the event the halogen has been replaced by a quaternary group, an ammonium, phosphonium or sulphonium radical and $R_2$ is hydrogen or a $C_1$ to $C_4$ alkyl group.

The product of the reaction between the halogen-containing allyl glycidyl ether reaction product and the active hydrogen-containing backbone compound will therefore have a number of pendant—$CH_2Cl$ groups which may be reacted with a tertiary amine such as trimethylamine to form a quaternized amine derivative and therefore, a number of cationic charges on the polymer molecule. This makes the adsorption onto cellulosic substrates more efficient. Conversely, the —$CH_2Cl$ group can be converted into a carboxyl, sulfonic, or other anionic group and this is often beneficial if the emulsifying surfactant type is anionic. Both external emulsifying surfactant and charge type on the polymer undergoing emulsification should of course be the same.

Often the introduction of a relatively modest number of charged groups is enough to improve the dispersibility of the polymer in aqueous solutions to the extent of rendering the polymer readily emulsifiable or even soluble in water.

An alternative method of introducing ionic groups is to form a derivative of the hydroxyl group at the end of a chain of polymerized glycidyl groups that can be converted to a quaternary group or carboxyl group. For example, an epoxy group can be formed thereon and this may then be condensed with a tertiary amine to produce a quaternary ammonium group with the same general result as has been determined above.

The reaction of the epoxy compound with the backbone molecule can take place under the influence of an acid catalyst, preferably a Lewis acid such as boron trifluoride, antimony pentafluoride, tin tetrachloride, phosphorus pentafluoride, zinc fluoborate or anhydrous hydrogen fluoride. Alternatively, but less preferably, a Lewis base such as sodium hydride or potassamide can be used. The temperature at which the reaction is performed is generally from 0° to 120° C. and preferably from ° to 80 ° C.

Air-drying of the polymers is much accelerated by the presence of traces of heavy metal salts including for example, cobalt acetate, cobalt octoate, manganese acetate and other organic salts of transition metals known to be capable of functioning as "metallic driers" in the paint field. Organic peroxides such as benzoyl peroxide and similar hydroperoxides are also found to be effective either alone or in conjunction with the metallic driers described above.

The incorporation of from 0.001 to 0.01% by weight of such a salt along with the polymer is a preferred feature.

Often it is desirable that the viscosity of a polymer solution be increased (or "bodied") prior to addition to the latex. An increase of viscosity can be achieved merely by passing air through the polymer itself or a solution or emulsion of the polymer so as to initiate viscosity building by an air-curing mechanism. By careful control of the amount of air used, an exact modification of the polymer viscosity can be achieved. While certain viscosifiers such as polyvinyl alcohol can be used for the same purpose, care must be taken to ensure that the viscosifier selected does not reduce the ease with which the polymer can translocate to the polymer cross-over points before cure. Air treatment also is effective in reducing very substantially the time needed to achieve a cure of the polymer.

PRODUCTION OF THE COMPOSITIONS

The composition of the invention can comprise stably dispersed solid particles of the thermoplastic polymer and liquid droplets of the hydrophilic polymer also stably dispersed in the same dispersion medium, usually water.

Alternatively the hydrophilic polymer may actually be present in the solid particles of the thermoplastic polymer either by penetration of the particles or occlusion or perhaps even as a coating on the surface of the polymer particles.

The blend of components A and B is preferably achieved by slowly adding with stirring the latex, Component A, to the air-curing polymer, Component B, at ambient temperatures. The rate of addition that is appropriate depends largely on the nature of the polymers but it is usually found that if the addition is too rapid, coagulation of latex may occur. Use of a protective colloid often increases the mechanical as well as the chemical stability of the blend.

The air-curing polymer can, as has been indicated above, be present in the form of the liquid polymer or as an emulsion. Where it is added to the latex directly it is often convenient to add at the same time a suitable emulsifier to aid in a coarse dispersion of Component B and to facilitate its ad- or absorption into the latex. In effect this technique brings about the self-emulsification of Component B.

Air curing resins commonly employ a heavy metal salt as a drier and this too may be added at this stage. Incorporation of these salts does not usually lead to premature cross-linking while the polymer/latex combination exists so that the shelf life is not greatly reduced by including the drier even at this early stage.

The formation of the composition of the invention is carried out by preference at room temperature and standard pressure though higher or lower pressures or temperatures may be used.

An alternative approach is to introduce a melt of the Component A polymer, if necessary together with a suitable dispersing agent, into an agitated emulsion of Component B.

The composition of the invention is commonly applied to a substrate as an emulsion with a 5–25% by weight polymer content though greater or smaller polymer contents, for example from 2 to 60% or preferably from 5 to 40% by weight, are permissible.

The proportions of the two Components A and B can be varied as required to meet a desired blend of properties. Usually however the ratio of Component A to Component B on a polymer weight basis can be from 5:95 to 95:5. Preferably however the weight ratio of A to B is from 20:80 to 80:20.

The composition of the invention is kept stable by excluding air. This can be done by sealing containers under an inert gas but usually the amount of air present in the space above the liquid in a conventional container in not enough to reduce the shelf life of the composition to an intolerably low level.

In many circumstances it is desirable to increase the viscosity of the composition by adding an additive such as polyvinyl alcohol in an amount of up to 2% by weight based on the air-curing polymer weight. While polyvinyl alcohol is the preferred viscosity modifier on account of its hydrophilic character, other modifiers that would not interfere with the stability or efficiency of the system can clearly be used. It is found, surprisingly, that viscosity modifiers give an increase in the viscosity of the aqueous phase and stabilize an emulsion of air-curing polymer droplets without deleteriously affecting the efficiency of the composition when applied to a substrate.

DESCRIPTION OF PREFERRED EMBODIMENTS

The invention is now more particularly described with reference to the following Examples which are for the purpose of illustration only and are intended to imply no limitation on the essential scope of the invention.

EXAMPLE 1

This Example describes a typical process by which Component B of the composition of the invention may be prepared.

A four liter four-necked round-bottomed flask equipped with a stirrer, thermometer, condenser and addition funnel was charged with 43.45 g (0.70 mol) of ethylene glycol and 1.0 g of boron trifluoride in ether.

The reaction mixture was blanketed in nitrogen and the addition of 799 g (7.0 mole) of allyl glycidyl ether was begun. The addition took place over six hours at a temperature of 77°–79° C. After addition of 200, 400 and 600 ml of the allyl glycidyl ether the addition was stopped, the temperature was reduced to about 20° C., and a further 0.5 g of the boron trifluoride catalyst was added dropwise with stirring. Upon completion of each catalyst addition the reaction temperature was again raised to 77°–79° C. and the addition of allyl glycidyl ether was resumed.

When the addition had been completed the reaction mixture was stirred for a further 30 minutes at 80° C. before being allowed to cool to room temperature.

The mixture was then triturated with 50 ml. of saturated potassium carbonate solution to neutralize the residual catalyst and then taken up in ether. This solution was washed with saturated sodium sulfate solution until neutral and then dried over anhydrous sodium sulfate.

After filtration and removal of the ether solvent 842.5 g of the air-curing polymer were obtained representing a 99.7 percent yield based on the theoretical yield. The polymer was in the form of an essentially colorless, slight/moderate viscosity oil.

EXAMPLE 2

This Example illustrates the production of compositions of the invention and demonstrates the effect of varying the proportions of Components A and B.

(A) A polyvinyl acetate latex (Component A) was prepared from a commercial latex, available from Monsanto Company as Gelva ®L-925, having a Brookfield viscosity of 50 cps (#1 spindle), 30 rpm, 25° C.) and a 0.1 micron average particle size. The commercial latex has an assay of 47–48 percent polymer solids and this was diluted to 25 percent by the dropwise addition of deionized water with stirring.

(B) An emulsion of the air curing polymer (Component B) prepared in Example 1 was made by blending together 25 parts of the polymer; 0.4 parts of 5 percent cobalt acetate tetrahydrate (metallic drier) in deionized water; 0.7 parts of 40 percent actives A-230 (sodium alkylbenzene sulfonate emulsifier); and 73.0 parts of deionized water.

This gave a 25 percent actives emulsion of the air-curing polymer.

Blends of different proportions of A and B were obtained by the dropwise "inverse" addition of B to A at ambient temperatures to form a latex/polymer emulsion blend.

These blends were then each sprayed onto duplicate Whatman #1 filter paper circles (12.5 cm diameter; 1.0 g in weight) using a technique permitting equal pickup on both sides. The total wet pickup weight per circle of filter paper was 0.9 g which is equivalent to a dry add-on weight of 200 kilos per metric ton of paper.

The filter paper circles were dried at 120° C. in an air-circulating oven for 10 minutes and then kept at constant temperatures and humidity until tested.

Testing was performed on an Instron tensile tester and one inch strips were cut from each circle in the machine direction, from either side of the centerfold. Two dry tensile strength measurements were made on the two test strips and an average value was computed. The wet tensile strength samples were additionally soaked for 5 minutes in a 1.0 percent aqueous solution of a sodium ($C_{11}$–$C_{12}$) alkyl benzene sulfonate emulsifier, rinsed with water and lightly dried with a blotter.

The results obtained are set forth in Table I.

TABLE 1

| Latex Composition A/B (dry weight basis ratio) | Wet Tensile Strength gm/cm | Dry Tensile Strength gm/cm | Wet/Dry Ratio |
| --- | --- | --- | --- |
| [Water-control] | 66.1 | 2107 | 0.030 |
| 0/100 | 3393 | 7001 | 0.485 |
| 33.3/66.7 | 3715 | 7573 | 0.490 |
| 50/50 | 4036 | 8216 | 0.491 |
| 66.7/33.3 | 4126 | 8412 | 0.490 |
| 90/10 | 3322 | 8537 | 0.389 |
| 100/0 | 643 | 7626 | 0.084 |
| 100/0 (1) | 679 | 7010 | 0.097 |

(1) Though containing no air-curing polymer the latex was treated with the same level of cobalt salt to determine the effect.

It was noted that all the latices incorporating the air-curing polymer wetted the filter paper circles almost instantly. There was no discernable latex holdout on the paper surface. In the samples containing 100 percent of the polyvinylacetate latex however, the latex collected at the surface as the water was wicked away by the fibers of the paper. This resulted in poor penetration of the sheet by the latex.

As can be seen from the results in Table 1 the use of the blend gives an improvement in wet strength particularly that is beyond anything that can be achieved with either the Component A or Component B alone.

EXAMPLE 3

This Example is essentially similar to Example 2 except that Component A of the latex differs.

A 25 percent emulsion of the air-curing polymer produced in Example 1 is prepared as described as in Example 2. This provided Component B for the blend.

Component A was provided by adding 23 g of deionized water to 25 g of 48 percent solids Rhoplex HA-8 (an aqueous latex of an acrylic polymer available from Rohm and Haas Corporation) to give a 25 percent polymer solids latex.

Components A and B were blended in a 1:2 weight ratio and the resultant latex composition was tested for wet and dry strength exactly as is described in Example 2. The results are compared with those obtained for the component above in Table 2.

TABLE 2

| Latex/Emulsion Composition A/B dry weight basis ratio | Application Level/kg/ metric ton | Wet Tensile Strength (gm/cm) | Dry Tensile Strength (gm/cm) | Wet/Dry Ratio |
|---|---|---|---|---|
| 0/100 | 200 | 3376 | 6965 | 0.485 |
|  | 133 | 2233 | 4411 | 0.506 |
| 33.3/66.7 | 200 | 2804 | 4608 | 0.609 |
|  | 300 | 3322 | 6805 | 0.488 |
| 100/0 | 200 | 305 | 2929 | 0.104 |
| (None-Water) | 0 | 66 | 2107 | 0.03 |

It should be noted that, at the 133 kg/metric ton addition level of 100 percent air-curing polymer, the actual amount added to the paper is the same as was added when the 33.3/66.7 blend was applied at the 200 kg/metric ton level. In spite of this the wet strength is somewhat higher for the blend than for the pure additive. A consideration of the wet strength imparted by the latex when used alone indicates clearly that the effect observed is not merely additive.

It is believed that the air-curing polymer materially assists in the penetration of the latex into the fibrous material so as to spread its effect through the whole body of the material. Regardless of theory however it is clear from the above that a novel and dramatic effect is involved.

EXAMPLE 4

The purpose of this Example is to demonstrate the relationship between the proportions of the components in the composition of the invention and the water-wicking time.

Three compositions were prepared each having a 10 percent polymer weight concentration. The first (A) was the polyvinyl acetate latex used in Example 2; the second (B) was the air-curing polymer prepared in Example 1; and the third was a 1:2 (by weight) blend of A and B respectively.

These compositions were sprayed onto Whatman #1 filter paper circles in the manner described in Example 2 at a 100 kg/metric ton application level. The filter paper circles were dried at 120° C. for 10 minutes in a circulating air oven. A 0.10 ml. drop of water was placed on the horizontally positioned treated substrate at a temperature of 22° C. The time taken for the water drop to dissipate, as measured by loss of gloss, was taken. Generally a water wicking time of less than 30 seconds is indicative of hydrophilic character.

In addition, to illustrate the difference in behavior of the compositions an application of 0.10 ml. droplet of each of the above three compositions was applied to a horizontally positioned untreated filter paper circle at 22° C. and the time for the water component of the compositions to disappear is measured. The results of both the above are shown in Table 3.

TABLE 3

| Treating Composition | Wicking Time in Seconds | |
|---|---|---|
|  | Water | Compositions |
| A. (Polyvinyl acetate) | 77 | 17.6 |
| B. (Air-curing polymer) | 2.7 | 5.1 |
| C. (1:2 blend of A & B) | 3.9 | 7.4 |
| Control (-no resin) | 1.4 | 1.4 |

EXAMPLE 5

This Example describes a way of making the compositions of the invention by a process in which the air-curing polymer is incorporated into the latex polymer particles.

A bluish latex of polyvinyl acetate stabilized using an anionic surfactant was stirred at room temperature. An aqueous emulsion of a liquid air-curing polymer, prepared by the process of Example 1, was added slowly to the latex and it was observed that the color changed to white. After stirring for 10 hours at room temperature the color of the mixture had returned to the original bluish color indicating that the air-curing polymer had been absorbed into, or possibly adsorbed on to, the latex polymer particles.

EXAMPLE 6

This Example illustrates the stabilizing effect of latices on some of the more active air-curing polymers.

An air-curing polymer was produced by reacting ethylene glycol with impure allyl glycidyl ether in a 1:20 mol ratio using a polymerization process similar to that described in Example 1.

A 25 percent by weight polymer content emulsion was made up by blending 25 g of the above air-curing polymer, 1.0 g of 5 percent aqueous cobalt acetate, 1.0 g of A-230 (sodium alkylbenzene sulfonate - an emulsifier) and 73.0 g of deionized water.

The emulsion was divided into two equal 50 g portions. One was immediately bottled and to the other were added slowly, with gentle stirring, 7.2 g of a 25 percent total solids Rhoplex HA-8 latex (an acrylic polymer latex available from Rohm and Haas Corporation). The mixture was stirred for 15 minutes to ensure complete mixing and then bottled.

The pure air-curing polymer agglomerated in less than 30 minutes whereas the blend was still non-agglomerated after 30 days.

Most air-curing polymers are very stable even in the presence of a metallic drier. If however the proportion of unsaturated groups is very high, (in the above polymer there are on average 10 activated, adjacent double bonds pendant from each hydroxyl residue of the ethylene glycol) there is an increased tendency to crosslink especially if the metallic drier is present. The present invention therefore provides an excellent way of preserving the storage stability of such polymers and, at the same time, obtaining the other advantages set forth above.

The latex compositions of the invention are capable of application in a very wide range of end uses. They are however best suited for application to fibrous substrates and specifically fibrous cellulosic substrates. Other fibrous materials from synthetic polymer fibers through to glass or other mineral fibers can also be treated though often a certain degree of tailoring of the components will be required. In addition to treating fibrous substrates the compositions of the invention can be used to enhance the effectiveness and/or properties of coating compositions such as paints and varnishes.

The invention described above is capable of many minor variations and modifications that do not depart from the essential spirit of the invention. It is intended that all such variations and modifications be embraced within the purview of this invention.

What is claimed is:

1. A polymer composition having a water wicking time of less than thirty seconds comprising:
   (A) from 5 to 95 percent by weight of a thermoplastic polymer in the form of solid, stably dispersed latex particles; and
   (B) from 95 to 5 percent by weight of a liquid hydrophilic polymer having a backbone comprising at least one segment with the formula

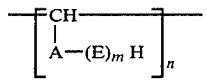

wherein A is a moiety terminating in the residue of an active hydrogen-containing group selected from the group consisting of alcoholic hydroxyl, thiol, amide, carboxylic acid and secondary amine with an active hydrogen removed, E is a moiety containing a radical having an activated olefinic unsaturation either $\alpha,\beta$ or $\beta,\gamma$ to the activating group; n is the number of adjacent segments having this formula and n and m are integers and are each at least one provided that where either is less than 4, the other is at least four; all weights being based on the total polymer weight in the composition.

2. A polymer composition according to claim 1 in which Component A is a film forming polymer capable of undergoing a thermolysis reaction below 180° C.

3. A polymer composition according to claim 1 in which Component A is a polymer of an unsaturated ester.

4. A polymer composition according to any of claims 1 to 3 in which Component B is the reaction product of a polyol with allyl glycidyl ether.

5. A polymer composition according to any of claims 1 to 3 in which Component B is the product of the reaction of a glycol with ally glycidyl ether in a molar ratio of at least 1:8.

6. A polymer composition having a water wicking time of less than 10 seconds comprising:
   (A) from 20 to 80 percent by weight of a thermoplastic polymer selected from the group consisting of poly-(ethylene/vinyl acetate), poly (ethylene/vinyl chloride) and acrylic acid ester polymers in the form of an aqueous latex; and
   (B) from 80 to 20 percent by weight of a liquid hydrophilic polymer obtained by the reaction of a polyol with at least 4 mols of allyl glycidyl ether per hydroxyl group in the polyol; all weights being based on the total polymer weight in the composition.

7. A polymer composition according to claim 6 which comprises a surfactant.

8. A polymer composition according to claim 6 which comprises from 5 to 40 percent by weight of polymer.

9. A polymer composition according to claim 6 comprising polyvinyl alcohol as a viscosity modifier.

10. A cellulosic fibrous substrate treated with a polymer composition having a water wicking time of less than thirty seconds comprising:
    (A) from 5 to 95 percent by weight of a thermoplastic polymer in the form of solid, stably dispersed latex particles; and
    (B) from 95 to 5 percent by weight of a liquid hydrophilic polymer having a backbone comprising at least one segment with the formula

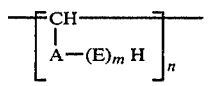

wherein A is a moiety terminating in the residue of an active hydrogen-containing group selected from the group consisting of alcoholic hydroxyl, thiol, amide, carboxylic acid and secondary amine with an active hydrogen removed, E is a moiety containing a radical having an activated olefinic unsaturation either $\alpha,\beta$ or $\beta,\gamma$ to the activating group; n is the number of adjacent segments having this formula and n and m are integers and are each at least one provided that where either is less than 4, the other is at least four; all weights being based on the total polymer weight in the composition.

11. A cellulosic fibrous substrate treated with a polymer composition having a water wicking time of less than 10 seconds comprising:
    (A) from 20 to 80 percent by weight of a thermoplastic polymer selected from the group consisting of poly(ethylene/vinyl acetate), poly (ethylene/vinyl chloride) and acrylic acid ester polymers in the form of an aqueous latex; and
    (B) from 80 to 20 percent by weight of a liquid hydrophilic polymer obtained by the reaction of a polyol with at least 4 mols of allyl glycidyl ether per hydroxyl group in the polyol; all weights being based on the total polymer weight in the composition.

12. A cellulosic fibrous substrate according to claim 11 wherein the polymer composition comprises a surfactant.

13. A cellulosic fibrous substrate according to claim 11 wherein the polymer composition comprises from 5 to 40% by weight of the polymer.

14. A cellulosic fibrous substrate according to claim 11 wherein the polymer composition comprises a polyvinyl alcohol viscosity modifier.

15. A cellulosic fibrous substrate according to any one of claims 11 to 14 in which the substrate is an airlaid cellulosic fiber mat.

* * * * *